US006358901B1

(12) United States Patent
Joye et al.

(10) Patent No.: US 6,358,901 B1
(45) Date of Patent: Mar. 19, 2002

(54) PAINT STRIPPING COMPOSITION

(75) Inventors: Jean-Luc Joye, Cranbury, NJ (US); Jean-Claude Galliot, Decines (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/600,562

(22) PCT Filed: Jan. 20, 1999

(86) PCT No.: PCT/FR99/00111

§ 371 Date: Jul. 19, 2000

§ 102(e) Date: Jul. 19, 2000

(87) PCT Pub. No.: WO99/37726

PCT Pub. Date: Jul. 29, 1999

(30) Foreign Application Priority Data

Jan. 21, 1998 (FR) ............................................. 98 00607

(51) Int. Cl.⁷ ............................. C11D 3/43; C11D 3/44
(52) U.S. Cl. .................. 510/201; 510/202; 510/210; 510/212; 510/407; 510/432; 134/38
(58) Field of Search .................................. 510/201, 202, 510/210, 212, 407, 432; 134/38

(56) References Cited

U.S. PATENT DOCUMENTS 3,179,609 A * 4/1965 Morison ...................... 260/28
5,011,621 A   4/1991 Sullivan ...................... 252/162

FOREIGN PATENT DOCUMENTS

EP           0 573 339       12/1993      ............ C09D/9/00

OTHER PUBLICATIONS

International Search Report Jan. 20, 1999.

* cited by examiner

*Primary Examiner*—Charles Boyer

(57) ABSTRACT

The invention concerns a composition for stripping coatings for example of paints. Said composition comprises at least an aromatic ether containing an alkoxy group with at least two carbon atoms and at least an aprotic polar solvent.

15 Claims, No Drawings

PAINT STRIPPING COMPOSITION

This application is an application under 35 U.S.C. Section 371 of International Application Number PCT/FR99/00111 filed on Jan. 20, 1999.

The present invention relates to a composition for stripping coatings, for example paint-based coatings.

The invention also relates to a method for stripping paints deposited on a substance, using said composition.

The first paint stripping compositions were based on methylene chloride and/or 1,1,1-trichloroethane (T.1.1.1.) (see, for example, United States patent U.S. Pat. No. 2,507,983 and German patent DE-A-2 524 752).

Such paint stripping compositions have the advantage of being highly effective and cheap. However, they can cause environmental damage and in particular can damage the ozone layer (Montreal protocol aimed at halting the use of T.1.1.1., normally at the end of 1995).

A substantial advance was made when such chlorinated solvents were replaced either by lactames or lactones, usually N-methyl-2-pyrrolidone or γ-butyrolactone (U.S. Pat. No. 4,120,810) or by a mixture of alkyl diesters of dibasic acids, a by-product of the production of monomers required to prepare polyamides (DE-A-3 438 399).

The above compositions are not always suitable for stripping coatings of different types such as water-based paint oil-based paint, lacquers, varnishes and plastic resins.

U.S. Pat. No. 2,694,658 discloses the use of dimethylsulphoxide as a paint stripping solvent. However, that type of solvent has the disadvantage of being very expensive and has to be used in large quantities.

European patent EP-A-0 573 339 discloses a novel stripping composition comprising a polar aprotic solvent and an ether comprising one or more methoxy groups and with well defined characteristics such as a flash point of more than 0° C. and a gram-molecular volume of less than 160.

The most economically interesting ether claimed is anisole. However, anisole has an unsatisfactory flash point as regards certain regulations in particular those concerning transport of flammable materials.

Further, anisole has a very strong odour which necessitates the use of an agent to mask the odour.

The market therefore has a need for an improved stripping composition.

Put precisely, the present invention aims to provide a stripping composition, in particular for stripping paints, characterized in that it comprises at least one aromatic ether comprising an alkoxy group containing at least two carbon atoms and at least one polar aprotic solvent.

Preferably, the flash point of the aromatic ether is 50° C. or higher.

In the present text, the term "alkoxy" is used generically as it also designates other ether groups as will be described below.

More particularly, aromatic ethers which are suitable for the invention and which can be cited are those with formula (I):

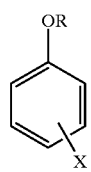
(I)

where:
R represents an alkyl, cycloalkyl or aralkyl radical containing at least two carbon atoms, preferably 2 to 12 carbon atoms;
X represents a hydrogen atom, an alkyl or alkoxy radical containing 1 to 4 carbon atoms, or a halogen atom, preferably a fluorine or chlorine atom.

Preferably, the ethers used have formula (I) where R represents an alkyl, cycloalkyl or aralkyl radical containing 2 to 7 carbon atoms.

Preferred ethers with formula (I) are those comprising a radical R which represents an ethyl. n-propyl, isopropyl, n-butyl, isobutyl, sec-butyl or tert-butyl radical, a cyclohexyl radical, a benzyl radical or an alkoxy radical containing 1 to 4 carbon atoms, preferably 2 to 4 carbon atoms such as ethoxy, propoxy, isopropoxy, butoxy, isobutoxy, sec-butoxy or tert-butoxy.

Regarding X, more particularly this represents a hydrogen atom, a fluorine atom, a methyl, ethyl, methoxy or an ethoxy radical.

The invention does not exclude the presence of a plurality of groups X, preferably at most 3.

Examples of aromatic ethers which can be mentioned include the following compounds;

phenetole;
4-ethylphenetole;
2-fluorophenetole;
3-fluorophenetole;
4-fluorophenetole;
propylphenylether;
isopropylphenylether
butylphenylether;
isobutylphenylether;
pentylphenylether;
sec-butylphenylether.

Preferably, the ether used in the compositions of the invention is phenetole.

In accordance with the invention, the stripping compositions of the invention associate an ether as defined above with a polar aprotic solvent.

Examples of polar aprotic solvents which can be cited are dimethylsulphoxide (DMSO), dimethylformamide (DMF), N-methyl-2-pyrrolidone (NMP), N-methylmorpholine, γ-butyrolactone, acetylacetone, acetonitrile and mixtures thereof.

Preferably, dimethylsulphoxide is used.

The present invention provides a composition for stripping paints comprising, by volume:
(1) 1% to 90% of a polar aprotic solvent;
(2) 1% to 90% of at least one aromatic ether comprising an alkoxy group containing at least two carbon atoms and with a flash point of more than 50° C.

Preferred compositions of the invention thus comprise at least, by volume:
(1) 20% to 80% of a polar aprotic solvent, more preferably 50% to 70%;
(2) 20% to 80% of an aromatic ether comprising an alkoxy group containing at least two carbon atoms, more preferably 30% to 50%.

The following are examples of compositions of the invention:
(1) 1% to 90%, preferably 20% to 80%, more preferably 50% to 70%, of a polar aprotic solvent selected from dimethylsulphoxide, dimethylformamide, N-methyl-2-pyrrolidone, N-methylmorpholine, γ-butyrolactone, acetylacetone, acetonitrile and mixtures thereof;
(2) 1% to 90%, preferably 20% to 80%, more preferably 30% to 50%, of an aromatic ether comprising an alkoxy group containing at least two carbon atoms.

Preferred compositions of the invention comprise:
(1) 1% to 90%, preferably 20% to 80%, more preferably 50% to 70% of a polar aprotic solvent selected from dimethylsulphoxide, dimethylformamide, N-methyl-2-pyrrolidone, N-methylmorpholine, γ-butyrolactone, acetylacetone, acetonitrile and mixtures thereof;
(2) 1% to 90%, preferably 20% to 80%, more preferably 30% to 50%, of phenetole.

The compositions of the invention can also contain other conventional additives.

Examples of such additives which can be mentioned include a co-solvent, a surfactant, a thickener, an activator, a corrosion inhibitor, an evaporation retardant or any other additive provided that it is not a chlorinated solvent.

Adding a co-solvent can generally increase the stripping performance of a composition by facilitating dissolution of the plasticisers present in the paint.

Examples of co-solvents which can be used are an aromatic or aliphatic, odour-free liquid hydrocarbon solvent with a flash point of more than 50° C., preferably more than 70° C., such that this solvent is not classifiable as a flammable solvent.

Examples of such solvents derived from petroleum and with a high flash point are mineral spirits such as white spirit and naphthas.

Commercially available products which can be used in the compositions of the invention are ISOPAR® from Exxon, SOLTROL® from Shell and HI-SOL® solvents from Ashland, in particular SOLVESSO® 100, 150 and 200.

However, as these hydrocarbon derivatives are classified as Xn (harmful), they are gradually being replaced by solvents of the dialkyl ester of a dibasic aliphatic acid type to avoid the final product being labelled as Xn.

Thus, preferably, a $C_1$–$C_4$ dialkyl ester of at least one dibasic $C_4$–$C_6$ aliphatic acid is used.

The dibasic acid ester mixture is a mixture of ester derivatives essentially of adipic, glutaric and succinic acids; in particular the alkyl groups of the ester portion are selected from methyl and ethyl groups, but they can also be propyl, isopropyl, butyl, n-butyl or isobutyl groups.

The above $C_4$ to $C_6$ dibasic acids are in fact by-products from preparing adipic acid which is one of the principal monomers of polyamides, and the dialkyl esters are obtained by esterification of this by-product which generally contains, by weight, 15% to 30% of succinic acid, 50% to 75% of glutaric acid and 5% to 25% of adipic acid.

The dibasic acid esters are products which are commercially available. Commercially available products which can in particular be cited are Rhodiasolv RPDE® sold by Rhone-Poulenc and "Du Pont Dibasic Esterst®" sold by Du Pont de Nemours.

Regarding the quantity of co-solvent to be used, it is recommended that 10 to 100 volumes be used, preferably 30 to 60 volumes of co-solvent per 100 volumes of (1) and (2).

It is possible to add one or more surfactants to the stripping composition. These surfactants facilitate using water to rinse the compositions on the substrate to be stripped, and in some cases accelerate the stripping action.

Examples of anionic surfactants which can be cited are alkali metal soap type anionic surfactants (alkaline salts of $C_8$–$C_{24}$ fatty acids), alkaline sulphonates ($C_8$–$C_{13}$ alkylbenzene sulphonates, $C_{12}$–$C_{16}$ alkylsulphonates), oxyethylenated and sulphated $C_6$–$C_{16}$ fatty alcohols, oxyethylenated and sulphated $C_8$–$C_{13}$ alkylphenols, and alkaline sulphosuccinates ($C_{12}$–$C_{16}$ alkylsulphosuccinates).

Non-ionic surfactants which can be mentioned include ethoxylated or ethoxypropoxylated alkylphenols and ethoxylated or ethoxypropoxylated fatty alcohols, ethoxylated or ethoxypropoxylated triglycerides, ethoxylated or ethoxypropoxylated fatty acids, ethoxylated or ethoxypropoxylated sorbitan esters, ethoxylated or ethoxypropoxylated fatty amines, ethoxylated or ethoxypropoxylated di(1-phenylethyl) phenols, and ethoxylated or ethoxypropoxylated tri(1-phenylethyl)phenols.

The number of oxyethylenated (OE) and/or oxypropylenated (OP) motifs of these non-ionic surfactants is normally in the range 2 to 100 depending on the desired HLB (hydrophilic/lipophilic balance). Preferably, the number of OE and/or OP motifs is in the range 2 to 50.

The ethoxylated or ethoxypropoxylated alkylphenols generally contain 1 or 2 linear or branched alkyl groups containing 4 to 12 carbon atoms, in particular octyl, nonyl or dodecyl.

An example of a preferred non-ionic surfactant which can be cited is nonylphenol ethoxylated with 2 to 9 ethylene oxide motifs.

The ethoxylated or ethoxypropoxylated fatty alcohols generally contain 6 to 22 carbon atoms, the OE and OP motifs being excluded from these numbers, and are preferably ethoxylated.

The ethoxylated or ethoxypropoxylated triglycerides can be triglycerides of animal or plant origin (such as lard, suet, peanut oil, butter oil, cottonseed oil, linseed oil, olive oil, palm oil, grapeseed oil, fish oil, soya oil, castor oil, rapeseed oil, copra oil or coconut oil), and are preferably ethoxylated.

The term "ethoxylated triglyceride" as used in the present invention means both the products obtained by ethoxylation of a triglyceride by ethylene oxide and those obtained by transesterification of a triglyceride by a polyethylene glycol.

The ethoxylated or ethoxypropoxylated fatty acids are esters of fatty acids (such as oleic acid, stearic acid) and are preferably ethoxylated.

The term "ethoxylated fatty acid" includes the products obtained by ethoxylation of a fatty acid by ethylene oxide and those obtained by esterification of a fatty acid by a polyethylene glycol.

The ethoxylated or ethoxypropoxylated sorbitan esters are esters of sorbitol cyclised with $C_{10}$ to $C_{20}$ fatty acids such as lauric acid, stearic acid or oleic acid, and are preferably ethoxylated.

The ethoxylated or ethoxypropoxylated fatty amines generally contain 10 to 22 carbon atoms, the OE and OP motifs being excluded from these numbers, and are preferably ethoxylated.

The surfactant or surfactants can be used in an amount which can, for example, be in the range 0.1% to 10%, preferably 0.5% to 5% by weight with respect to the total composition weight.

It is desirable for the compositions of the invention to contain thickeners to enable the composition to be applied to vertical surfaces.

Conventional thickeners can be used, such as cellulose derivatives (ethylcellulose, hydroxypropylcellulose), xanthane gum, guar gum, carob gum, alginates, polyacrylates, starches, modified starches and modified clays.

The thickeners are preferably used in an amount in the range 0.5% to 10% by weight with respect to the total composition weight, preferably in the range 1% to 3%.

In order to increase the rate of paint removal, an activator can be added. It is a small polar molecule which will assist in the rupture of the adhesive bonds between the paint film and the substrate. Examples which can be cited are methylphosphoric ester or formic acid in a form which is neutralised by an amine, preferably triethanolamine (TEA).

The activators are preferably used in an amount in the range 0.5% to 2% by weight with respect to the total composition weight, preferably about 1%.

The stripping compositions can also, for example, contain corrosion inhibitors, preferably triethylammonium phosphate or sodium benzoate; evaporation retardants, for example paraffinic greases with a melting point in the range 46° C. to 57° C.; and abrasive particles selected from aluminium oxide, silica, silicon carbide, tungsten carbide and silicon carbonitride.

The compositions of the invention enable paint to be stripped.

In the present text, the term "paint" is used generically. It designates any coating of a polymeric nature deposited on a support, more particularly paints proper, varnishes and plastic resins.

The compositions are of particular application to oil-based paint, polyurethane paint, water-based paint, alkyd-urethane paint, acrylic-polyurethane pain and epoxy paint.

The paints are preferably paints used in the domestic and industrial sectors, in particular in the building industry.

The substrates to be cleaned or stripped can be of a variety of natures.

The most usual substrates are: wood, metals and their alloys such as steel, stainless steel, aluminium, copper, iron; plastics materials, and mineral glasses.

Advantageously, compositions comprising phenetole and DMSO and/or DMF and/or NMP are used to strip paints, preferably of the polyester or polyurethane type.

The invention also provides a method for stripping paint from a substrate, characterized in that said paints are brought into contact with a composition of the present invention.

The compositions of the invention can be prepared at ambient temperature (generally 5° C. to 25° C.) simply by mixing the various components, using a stirrer or any other suitable apparatus.

The stripping method is carried out by bringing the object or surface to be stripped into contact with the composition of the present invention.

This contact is continued until the paint swells, forms blisters and detaches.

The object or surface to be stripped can be brought into contact with the composition of the present invention in a variety of manners.

These manners include immersion, spraying, and coating using a brush.

Contact is carried out at a temperature in the range 5° C. to 25° C., i.e., at ambient temperature.

The contact time is in the range 15 to 120 minutes.

The invention provides a stripping composition preferably comprising phenetole associated with a polar aprotic solvent.

The use of phenetole has a number of advantages, namely its performances is highly satisfactory, it improves the odour problems encountered when using a DMSO/anisole mixture, and it can increase the flash point of the mixture.

The composition of the invention is thus free of chlorinated solvents and is stable on storage for at least one year.

Examples of the invention will now be given.

In the examples, the percentages of the constituents of the stripping composition are given by volume unless otherwise indicated.

These examples are given by way of illustration and are not limiting in nature.

EXAMPLES

Firstly, the operating protocol followed in the examples will be described.

Four drops of formulation were applied to painted plates and a chronometer was used to note the time required for swelling or "blistering" of the paint without any mechanical aid. This time was recorded in minutes or hours if the stripping time was over 60 minutes.

The formulations were tested on painted plates produced by ETALON.

Polyurethane paint Ref. (ZC090190/POLYU) batch n° 5654-6;

White polyester paint (ZX090190B/389) batch n° 5653-6.

The following results were obtained:

| Solvent composition containing 1% by weight of formic acid and 3% by weight of TEA | | Time required for paint to swell | |
|---|---|---|---|
| | | Polyester paint | Polyurethane paint |
| 100% DMSO | | No action | No action |
| 100% NMP | | No action | 40 min |
| 100% DMF | | No action | 1 h 30 min |
| 100% anisole | | 30 min | 1 h 15 min |
| 100% phenetole | | 1 h 15 min | No action |
| 50% DMSO | 50% anisole | 22 min | 18 min |
| 50% DMSO | 50% phenetole | 23 min | 20 min |
| 50% NMP | 50% anisole | 45 min | 30 min |
| 50% NMP | 50% phenetole | 27 min | 27 min |
| 50% DMF | 50% anisole | 15 min | 20 min |
| 50% DMF | 50% phenetole | 15 min | 20 min |

An examination of this table clearly shows that there is a synergistic effect between phenetole and the polar aprotic solvent.

The stripping power of phenetole-based formulations is equivalent to that of anisole-based formulations.

Phenetole-based formulations are substantially less odorous than anisole-based formulations. This means that the use of masking agents in the final formulation can be avoided.

The use of phenetole in stripping formulations can increase the flash point compared with anisole.

| Solvent composition containing 1% by weight of formic acid and 3% by weight of TEA | | Closed cup flash point |
|---|---|---|
| 50% DMSO | 50% anisole | 48–49° C. |
| 50% DMSO | 50% phenetole | 56–57° C. |

What is claimed is:

1. A stripping composition comprising by volume:

(1) 20% to 80% of at least one polar aprotic solvent selected from the group consisting of dimethylsulphoxide, dimethylformamide, N-methyl-2-pyrrolidone, N-methylmorpholine, γ-butyrolactone, acetylacetone and acetonitrile, and (2) 20% to 80% of at least one aromatic ether of formula (I):

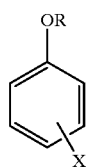

wherein:
R represents an alkyl, cycloalkyl or aralkyl radical containing 2 to 12 carbon atoms; and
X represents a hydrogen atom, an allyl containing 1 to 4 carbon atoms, an alkoxy radical containing 1 to 4 carbon atoms, or a halogen atom.

2. A composition according to claim 1, wherein R represents an alkyl, cycloalkyl or aralkyl radical containing 2 to 7 carbon atoms and X is a chlorine or a fluorine atom.

3. A composition according to claim 2, wherein R represents an alkyl radical containing 2 to 4 carbon atoms.

4. A composition according to claim 1, wherein the aromatic ether is phenetole.

5. A composition according to claim 1, comprising, by volume:
(1) polar aprotic solvent: 50% to 70%; and
(2) aromatic ether comprising an alkoxy group containing at least two carbon atoms: 30% to 50%.

6. A composition according to claim 1, further comprising a co-solvent, a surfactant, a thickener, an activator, a corrosion inhibitor, or an evaporation retardant.

7. A composition according to claim 6, wherein the co-solvent is a $C_1$–$C_4$ dialkyl ester of at least one dibasic $C_4$–$C_6$ aliphatic acid.

8. A composition according to claim 1, for stripping paint, varnish and plastic resin.

9. A composition according to claim 8, wherein said paint is an oil-based paint, polyurethane paint, water-based paint, alkyd-urethane paint, acrylic-polyurethane paint, or epoxy paint.

10. A composition according to claim 1 for stripping a coating deposited on wood, metals, metal alloys, steel, stainless steel, aluminium, copper, iron, plastic material, or mineral glass.

11. A method for the preparation of a composition as defined in claim 1, comprising the step of mixing the aromatic ether with the polar aprotic solvent.

12. A method for stripping a coating deposited on a substrate, comprising the step of bringing into contact the coating with the composition defined in claim 1.

13. A method according to claim 12, wherein contact is continued until the paint swells, forms blisters and detaches.

14. A method according to claim 12, wherein said contact is carried out by immersion, spraying, or coating using a brush.

15. A method according to claim 12, wherein said contact is carried out at ambient temperature.

* * * * *